United States Patent [19]

Stockinger

[11] 4,173,813
[45] Nov. 13, 1979

[54] BEARING PULLER

[75] Inventor: John Stockinger, Littlefield, Tex.

[73] Assignees: John M. Clayton, Jr.; W. H. Berry, Jr.; John M. Clayton, III, all of Littlefield, Tex.

[21] Appl. No.: 880,784

[22] Filed: Feb. 24, 1978

[51] Int. Cl.² ............................................ B23P 19/04
[52] U.S. Cl. .................................................... 29/266
[58] Field of Search ................. 29/256, 258, 266, 265, 29/427; 85/32 K

[56] References Cited

U.S. PATENT DOCUMENTS

| 1,464,693 | 8/1923 | Campbell | 29/265 |
| 2,290,429 | 7/1942 | Harrington | 29/265 |
| 3,241,223 | 3/1966 | Anderson | 29/265 |
| 3,957,247 | 5/1976 | Haller et al. | 254/131 |
| 4,059,199 | 11/1977 | Quaney | 85/32 K |

Primary Examiner—James L. Jones, Jr.
Attorney, Agent, or Firm—Wendell Coffee

[57] ABSTRACT

A special tool removes bearings with hexagonal holes from bearing cups. A spool with a hexagonal flange on its end is inserted through the hexagonal hole and is locked behind the bearing. A bolt, threaded through the spool, forces the bearing out of the cup.

6 Claims, 6 Drawing Figures

BEARING PULLER

BACKGROUND OF THE INVENTION (1) Field of the Invention

This invention relates to bearing pullers and more particularly to pullers of bearings from bearing cups, such as nose cones and other closed end fixtures.

(2) Description of the Prior Art

It has been recognized that bearings often wear out and need replacement. If the bearing is located at the end of a shaft within a closed end fixture some mechanical device is needed to assist in the removal of the bearing.

An example of such a bearing is upon the nose cone of cotton strippers. A hexagonal shaft extends downward and terminates within a nose cone. This nose cone is in the form of a cup. A bearing having a hexagonal hole therethrough is within the cup and the hexagonal shaft fits within the hexagonal hole. The removal of these bearings from the nose cone presents a difficult problem and the common commercial practice today is to cut them out.

Before this application was filed, an independent search was made which produced the following references:

| Alspaugh | 869,861 |
| Beddard | 1,289,611 |
| Campbell | 1,464,693 |
| White | 2,036,665 |
| Harrington | 2,290,427 |
| Layne | 3,691,612 |

HARRINGTON discloses a bearing puller incorporating an expanding sleeve which pulls the bearing from a blind hole. A bolt is threaded through a spool which expands the sleeve.

LAYNE discloses a sleeve which is a cylinder liner. The puller which has a movable member which is inserted sideways and then swings out to engage the bottom of the sleeve. This unit requires clearance at the bottom of the sleeve.

The other four patents do not appear to be as pertinent as HARRINGTON and LAYNE.

SUMMARY OF THE INVENTION (1) New and Different Function

I have solved the problem of removing bearings from bearing cups such as nose cones and other closed end fixtures, which have a limited space between the bearing and the closed bottom of the bearing cup. This is accomplished by inserting a spool with a hexagonal flange on the end thereof through the bearing opening which is the same size and correlative shape as the flanged end of the spool. The flange is rotated beneath the inner race of the bearing. The bearing is removed as a bolt threaded through the spool is turned relative to the spool.

Thus, it may be seen that the total function is far greater than the sum of the individual functions of the spool, bolt, flanges, etc.

(2) Objects of the Invention

An object of this invention is to pull bearings.

Another object is to provide a bearing puller for a bearing in a blind hole.

Further objects are to achieve the above with a device that is sturdy, compact, durable, lightweight, simple, safe, efficient, versatile, ecologically compatible, energy conserving, and reliable, yet inexpensive and easy to manufacture, operate and maintain.

Other objects are to achieve the above with a method that is versatile, ecologically compatible, energy conserving, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
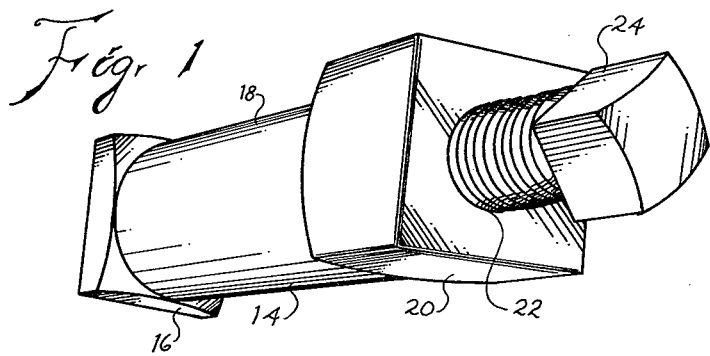
FIG. 1 is a perspective view of a bearing puller according to my invention.

FIG. 1 shows a bearing puller comprising spool 14 having a bottom and a top end. Flange 16 is on the bottom end of the spool 14. Neck 18 on the spool 14 is of lesser cross-section than the flange 16. The neck 18 is cylindrical. It is not essential for the neck 18 to be cylindrical, but it is necessary that the greatest distance across the neck 18 be less than the least dimension across the flange 16. Wrench flats 20 are on the top end of the spool 14. Axial hole 22 extends through the spool 14. Bolt 24 is threaded through the spool 14.

Figure 2:
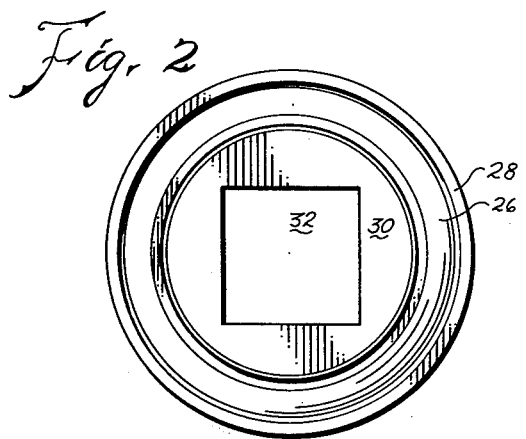
FIG. 2 is a top plan view of a bearing in a cup showing a square hole in the inner race.

FIG. 2 shows a bearing 26 having outer race 28, and inner race 30. Non-circular hole 32 is in the inner race.

Figure 3:
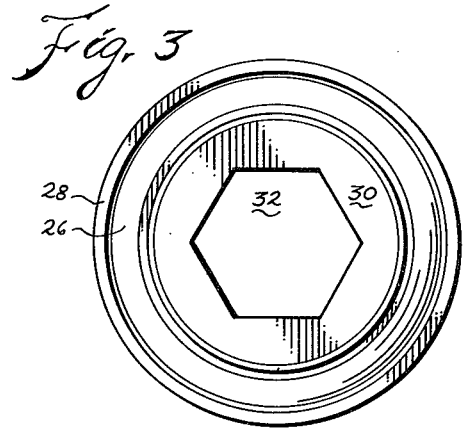
FIGS. 3 and 4 are similar views to FIG. 2 showing different configurations of the opening in the inner race.
Figure 4:
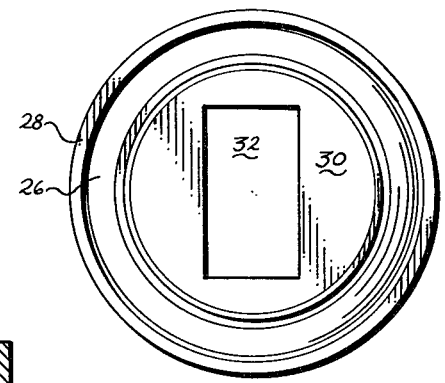

FIGS. 3 and 4 show similar bearings having different non-circular openings in the inner race 30. These openings may be of any non-circular cross section, although the most common is hexagonal (FIG. 3). The openings could be square (FIG. 2) or rectangular, having a length greater than the width (FIG. 4).

Figure 6:
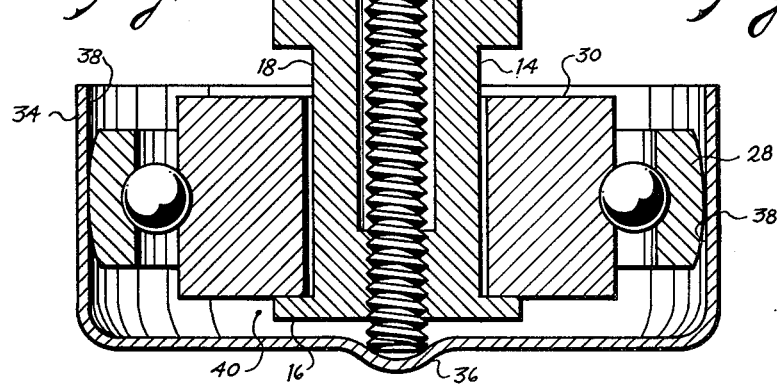
FIG. 6 is a cross-sectional view of the puller of FIG. 1 and bearing in a bearing cup.

FIG. 6 shows the bearing puller inserted through bearing 26 which has been installed in bearing cup 34 having closed bottom 36 and cylindrical sides 38. A limited space 40 exists between the inner race 30 and the closed bottom 36.

Figure 5:
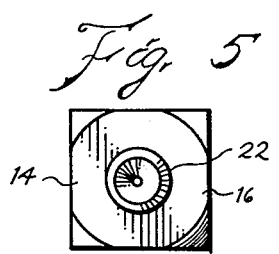
FIG. 5 is a bottom view of the puller of FIG. 1 showing a square flange.

Flange 16 on the bottom end of the spool 14 is of correlative cross-section as the hole 32 in the inner race 30 and smaller than the hole 32 so that the flange 16 will fit snugly, yet move smoothly through the hole 32. The embodiment shown in FIGS. 1 and 5 show this flange to be square so that it would fit with the square hole 32 of FIG. 2. The thickness of the flange 16 is such that it is less than the space 40 between the inner race 30 and the closed bottom 36 of the bearing cup 34.

Neck 18 of the spool 14 is of circular cross-section and the maximum diameter of the neck 18 is less than the smallest diameter of the hole 32 in the inner race 30 of bearing 26.

The bearing puller has hole 22 bored through its longitudinal axis, but only that portion of the hole 22 at the bottom end of the spool 14 and through the flange 16 is threaded. The remainder of the bored hole 22 is of a greater diameter.

The bearing 26 is removed from the cup 34 by placing the flange 16 through the non-circular hole 32 which has an axis into the space 40 between the inner race 30 and the closed bottom 36. The spool with the flange 16 is then rotated about the axis of the hole so that a portion of the flange 16 is beneath the inner race 30. The bolt 24 is rotated in the spool 14 until the end of the bolt 24 contacts the closed bottom 36 of bearing cup 34. The flange 16 is then locked against the inner race 30 of the bearing 26. As the bolt 24 is further rotated, bearing 26 is removed from the bearing cup 34. The wrench flats 20 on the top of the spool 14 provide a means for gripping the puller with a wrench, while the head on the bolt provides a similar means for gripping it.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim:

1. In combination, a bearing and a bearing puller for removing the bearing;
   a. the bearing within
   b. a cup having
      (i) a closed bottom, and
      (ii) cylindrical sides,
   c. said bearing having
      (i) an outer race pressed into the cylindrical sides of the cup, and
      (ii) an inner race in the outer race with
      (iii) a non-circular hole in the inner race, and there being
   d. a space between the inner race and the closed bottom; the bearing puller including:
   e. an integral spool having a bottom and top end,
   f. a flange on the bottom end of the spool,
      (i) said flange in the space between the inner race and the closed bottom,
      (ii) said flange of correlative cross-section as the hole in the inner race and smaller than the hole, and
      (iii) said flange having a thickness less than the space between the inner race and closed bottom,
   g. a neck on the spool of lesser cross-section than the flange and extending through the inner race,
   h. wrench flats on the top end of the spool above the bearing,
   j. a threaded axial bore through the spool, and
   k. a screw threaded through the spool.

2. The invention as defined in claim 1 wherein said hole and flange are hexagonal.

3. The invention as defined in claim 1 wherein
   m. only that portion of the bore at the bottom of the spool and through the flange is threaded, and
   n. the remainder of the bore is of a greater diameter.

4. The invention as defined in claim 1 wherein
   m. the neck is of circular cross-section, and
   n. the diameter of the neck is less than the smallest diameter across the hole.

5. The invention as defined in claim 4 wherein said hole and flange are hexagonal.

6. The invention as defined in claim 5 wherein
   o. only that portion of the bore at the bottom of the spool and through the flange is threaded, and
   p. the remainder of the bore is of a greater diameter.

* * * * *